US007281702B2

(12) United States Patent
Jacobs et al.

(10) Patent No.: US 7,281,702 B2
(45) Date of Patent: Oct. 16, 2007

(54) METHODS AND APPARATUS FOR MIXING AND DISTRIBUTING FLUIDS

(75) Inventors: Garry E. Jacobs, Aliso Viejo, CA (US); Steven W. Stupin, Orange, CA (US); Gerald Zeininger, Long Beach, CA (US); Nathan Barber, Aliso Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 315 days.

(21) Appl. No.: 10/514,082

(22) PCT Filed: May 28, 2003

(86) PCT No.: PCT/US03/16831

§ 371 (c)(1),
(2), (4) Date: Apr. 14, 2005

(87) PCT Pub. No.: WO03/099426

PCT Pub. Date: Dec. 4, 2003

(65) Prior Publication Data

US 2005/0167859 A1 Aug. 4, 2005

(51) Int. Cl.
*B01F 3/04* (2006.01)
(52) U.S. Cl. ....................................... 261/79.2

(58) Field of Classification Search ............... 261/79.2, 261/114.1, 114.2
See application file for complete search history.

(56) References Cited

U.S. PATENT DOCUMENTS

| 1,494,675 | A | * | 5/1924 | Ehrhart ........................ 239/483 |
|---|---|---|---|---|
| 1,557,112 | A | * | 10/1925 | Schneible .................... 261/79.2 |
| 3,146,189 | A | * | 8/1964 | Kunreuther et al. ......... 208/146 |
| 3,315,445 | A | * | 4/1967 | De Seversky .................. 96/53 |
| 3,378,349 | A | * | 4/1968 | Shirk .......................... 422/194 |
| 3,566,582 | A | * | 3/1971 | Yankura ....................... 95/219 |
| 3,651,619 | A | * | 3/1972 | Miura .......................... 96/314 |
| 3,685,971 | A | * | 8/1972 | Carson ......................... 422/220 |
| 3,915,847 | A | * | 10/1975 | Hutchings .................... 208/146 |
| 4,126,539 | A | * | 11/1978 | Derr et al. ................... 208/108 |
| 4,227,896 | A | * | 10/1980 | Larsson et al. ............. 261/78.2 |
| 4,579,647 | A | * | 4/1986 | Smith ..................... 208/111.01 |
| 6,227,524 | B1 | * | 5/2001 | Kiselev et al. .............. 261/79.2 |
| 7,125,006 | B2 | * | 10/2006 | Jacobs et al. ............. 261/114.2 |
| 2005/0167859 | A1 | * | 8/2005 | Jacobs et al. .............. 261/79.2 |

* cited by examiner

*Primary Examiner*—Richard L. Chiesa
(74) *Attorney, Agent, or Firm*—Fish & Associates, PC

(57) ABSTRACT

A flow distribution device (100) has a vane distributor (111) at least partially disposed within a cartridge (102) and is operationally coupled to a second distributing device (112) that receives output from the vane distributor (111) Especially preferred flow distribution devices (100) are disposed within a vessel containing a contact bed, and may include at least a second vane distributor (112) within the cartridge (102), wherein the vane distributors (111, 112) are preferably swirl-inducing vane distributors (111, 112).

9 Claims, 4 Drawing Sheets

METHODS AND APPARATUS FOR MIXING AND DISTRIBUTING FLUIDS

FIELD OF THE INVENTION

The field of the invention is fluid mixing and distribution.

BACKGROUND OF THE INVENTION

Many industrial processes involve mixing and distribution of fluids, and proper mixing and homogeneous distribution of fluids is especially important to ensure economic operation at high throughput rates in catalytic reactors or fractionation columns. However, various difficulties typically arise with high volume throughput, and especially where the fluid has multiple phases (e.g., liquid and vapor). Consequently, numerous approaches have been tried to circumvent at least some of the problems.

For example, many fixed bed reactors and other vessels with concurrent downflow of one or more fluid phases employ inlet diffusers. Inlet diffusers are typically located at the inlet nozzle and are generally configured to effect a distribution of the fluid onto a cross-sectional area in the vessel below (see e.g., U.S. Pat. No. 3,685,971 to Carson). Where appropriate, inlet diffusers may be utilized in combination with additional devices, and particularly distribution trays (see e.g., U.S. Pat. No. 3,146,189 to Halik, et al.). While such configurations often provide at least some homogeneous distribution of a liquid over a target area, all or almost all of them exhibit significant shortfalls when vapor and liquid phases need to be homogeneously distributed.

To circumvent at least some of the problems with homogeneous distribution of vapors and liquids, inlet diffusers may be configured to achieve at least partial disengagement of the entering vapor and liquid phases (see e.g., U.S. Pat. No. 3,378,349 to Shirk, et al., or U.S. Pat. No. 4,579,647 to Smith). Such inlet diffusers, which typically improve homogeneous distribution of vapor and liquids at least to some degree, are, however, often not satisfactory when the vapor and liquid may enter the inlet diffuser with significant momentum and in a very non-homogeneous manner. Vapors and liquids may be homogenized to help improve distribution as described, for example, in U.S. Pat. No. 4,126,539 to Derr, et al., by providing perforated plates in combination with passageways defined by concentric frustoconical sections. However, and especially where the liquid and vapor have a relatively high momentum, liquid may pass primarily through the orifices located near the points where the liquid impacts the perforated plate. Furthermore, a non-uniform vapor velocity profile may result in vapor recirculation zones above the perforated plate, with consequent inhibition of the liquid flow through orifices located below these vapor recirculation zones.

Alternatively, as described in U.S. Pat. No. 3,915,847 to Hutchings, a perforated plate together with a tube sheet and distribution conduits may be employed to assist homogeneous distribution of vapor and liquid. However, maldistribution of liquids and vapors may still persist in such configurations due to liquid impingement upon and/or vapor recirculation above the perforated plate. Moreover, such configurations typically inhibit personnel access to a vessel, as such configurations are not readily withdrawn through the top nozzle of the vessel.

In still other approaches, mixing devices may include a configuration with chevron-type vanes, wherein the device is disposed between the outlet of a mixing chamber and an imperforate deck as described in copending U.S. patent application Ser. No. 10/031,856, filed on Nov. 8, 2002, now U.S. Pat. No. 7,125,006, which is incorporated by reference herein. While such devices typically improve mixing and distribution of liquids and vapors, circumferentially asymmetric fluid distribution may still occur, especially when the liquid and vapor stream enters the mixing and distribution device asymmetrically.

Thus, although there are numerous mixing and distribution devices known in the art, all or almost all of them suffer from one or more disadvantages. Therefore, there is still a need for improved methods and apparatus for mixing and distributing fluids.

SUMMARY OF THE INVENTION

The present invention is directed to methods and configurations of flow distribution devices that include a vane distributor at least partially disposed within a cartridge and operationally coupled to a second distributing device that receives output from the vane distributor.

In particularly preferred devices, the vane distributor comprises a swirl-inducing vane distributor, and it is especially preferred that such devices may include a second vane distributor disposed in the cartridge (e.g., fluidly coupled together via a perforated plate), wherein the vane distributor and the second vane distributor are configured such that a flow that exits the vane distributor changes direction before entering the second vane distributor. In further especially preferred devices, the second distributing device is disposed at least partially outside of the cartridge, and the vane distributor has a plurality of vanes, and wherein at least one vane is positioned at an acute angle relative to a radius of the cartridge.

Various objects, features, aspects and advantages of the present invention will become more apparent from the following detailed description of preferred embodiments, along with the accompanying drawings in which like numerals represent like components.

DETAILED DESCRIPTION

The inventors have discovered that mixing and distribution devices can be significantly improved by providing such devices with a vane distributor that is at least partially disposed within a cartridge and operationally coupled to a second distributing device that receives output from the vane distributor. The term "fluid" as used in the specification and claims is meant to include both liquids and gases. The term "vapor" and "gas" are used interchangeably herein.

Especially preferred devices will include a swirl-inducing vane distributor (i.e., a vane distributor in which at least some of the vanes have an orientation such that the vapor/liquid that exits the distributor will have a rotational momentum) that receives an input comprising at least one of a vapor and a liquid, wherein the vapor and/or liquid that exits the distributor is contained within a cartridge (which may or may not be at least in part an integral portion of a vessel). Even more preferably, it is contemplated that a second vane distributor within the cartridge will receive at least a portion of the mixed vapor and/or liquid, wherein the first vane distributor and the second vane distributor are fluidly coupled together via a perforated plate.

Figure 1:
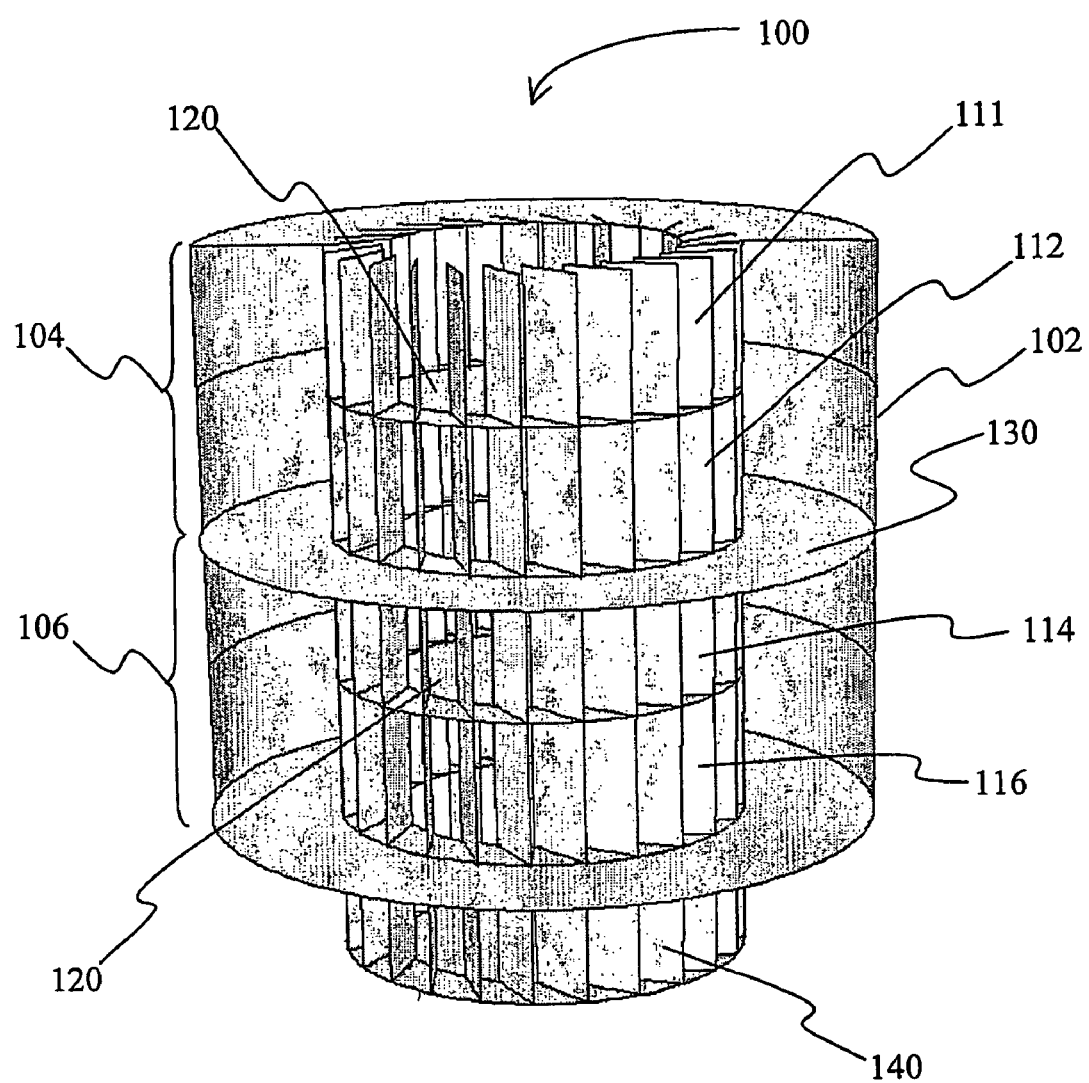
FIG. 1 is a perspective view of an exemplary device comprising five swirl-inducing vane distributors, four of which are contained within a cartridge, with the swirl direction changing at the inlets to the second through fifth distributors.

One particularly preferred device 100 is depicted in FIG. 1 and has a cartridge 102 that encloses a first and second swirl-inducing vane distributor 111 and 112, respectively, wherein the distributors are coupled together via imperforated plate 120. A separator 130 forms together with the cartridge 102 an enclosed space 104 that allows fluid communication between the first and second distributors 111 and 112, and prevents fluid communication between spaces 104 and 106 in a path other than through distributors 112 and 114. Second space 106 (formed by separator 130 and the cartridge 102) includes distributors 114 and 116, which are separated via plate 120. Additional distributing device 140 (preferably a swirl-inducing vane distributor) is disposed outside of cartridge 102 and in fluid communication with the distributor 116.

In further preferred aspects, the inlets to the vane distributors may be surrounded by a weir (not shown). For example, the inlet to the second vane distributor 112 may be surrounded by a weir (not shown) and it is contemplated that the weir may enhance the capacitance for liquid hold-up within enclosed space 104, thereby further promoting mixing and redistribution of fluids flowing through the device. All weir shapes are contemplated, including straight, V-notch, trapezoidal, and proportional.

It should be appreciated that in the configuration of FIG. 1 the vanes in each distributor are oriented in the same direction, when viewed from the cartridge inlet. Consequently, the trajectory of fluid/vapor flowing through one distributor must be significantly altered (if not even reversed) to enter the next (and following) distributor(s). Therefore, it is contemplated that these trajectory changes, induced by the vane orientation, will promote turbulence, mixing, and redistribution of the fluids.

Figure 2:
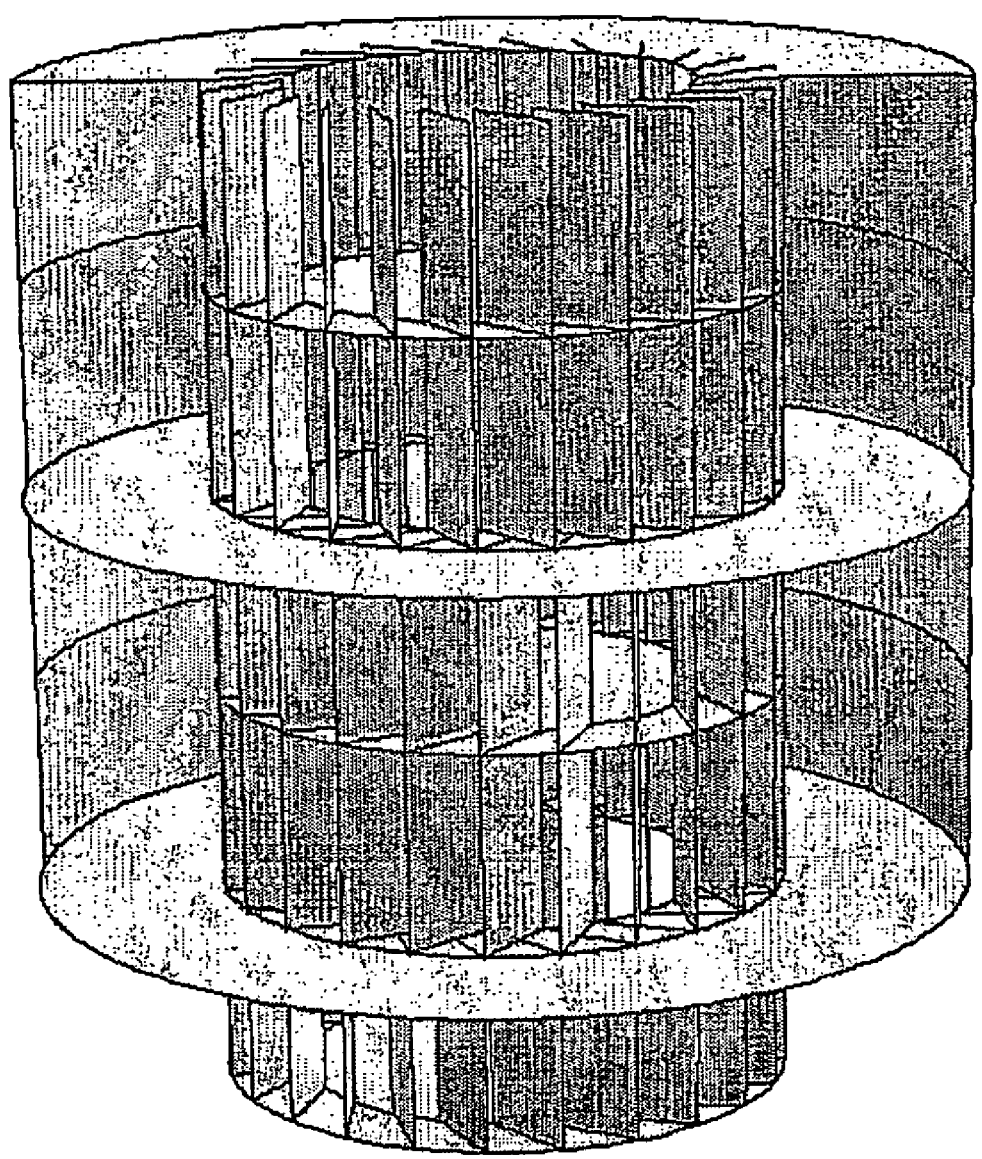
FIG. 2 is a perspective view of an exemplary device comprising five swirl-inducing vane distributors, four of which are contained within a cartridge, with the swirl direction changing at the inlets to the second and fourth distributors.
Figure 3:
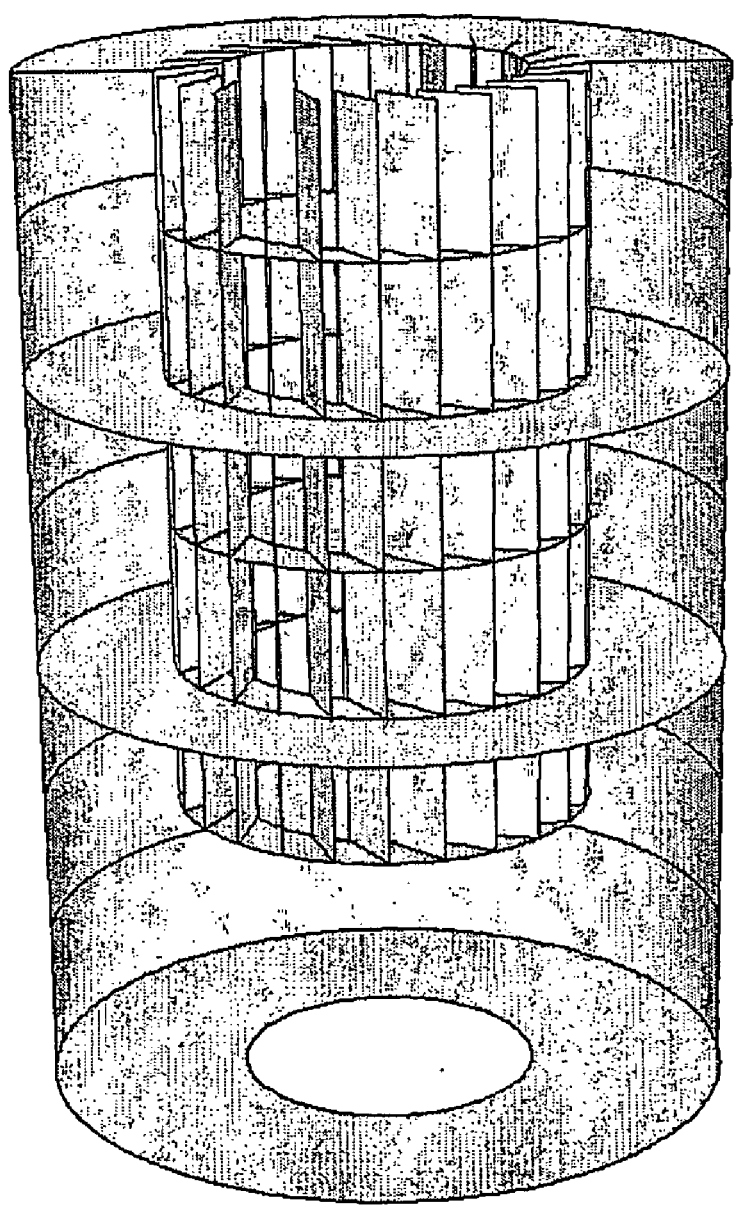
FIG. 3 is a perspective view of an exemplary device comprising five swirl-inducing vane distributors, all of which are contained within a cartridge.
Figure 4:
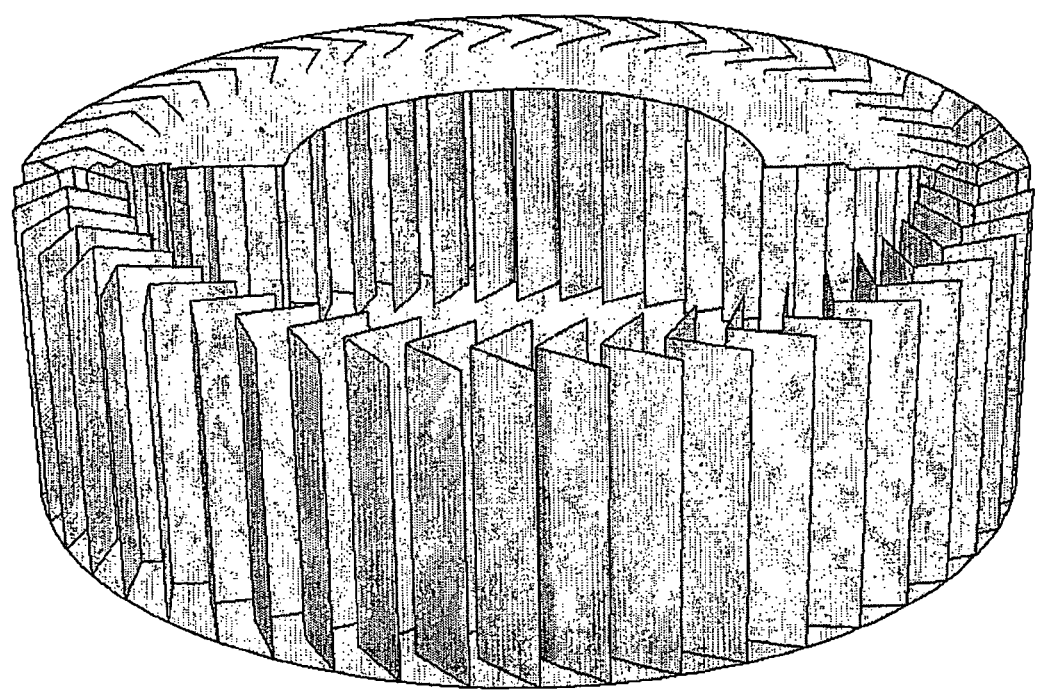
FIG. 4 is a perspective view of a distribution device with chevron-type vanes, disposed between two plates.

Alternatively, as depicted in FIG. 2, the vanes of the device of FIG. 1 in the first, second, and fifth distributors are oriented in a direction opposite of the vanes in the third and fourth distributors, when viewed from the cartridge inlet. Again, the trajectory of fluid/vapor flowing through the first and third distributors must be significantly altered (if not even reversed, e.g., from counterclockwise to clockwise) to enter the next distributor. Therefore, it is contemplated that these trajectory changes, induced by the vane orientation, will promote turbulence, mixing, and redistribution of the fluids.

Where it is desirable that the terminal distributor is at least partially, and more preferably entirely disposed within the cartridge, the cartridge may be extended to include the terminal (here: fifth) distributor to create an enclosed volume below the terminal distributor as shown in FIG. 3. In further preferred aspects, the cartridge outlet may be surrounded by a weir (not shown). It is contemplated that such enclosed volume may provide capacitance for liquid hold-up within the cartridge, thereby further promoting mixing and redistribution of fluids flowing through the device.

Where it is desirable that the terminal distributor is disposed outside the cartridge, it should be recognized that the terminal distributor may comprise various types of vanes, and it is especially preferred that the terminal distributor includes chevron-type vanes or swirl-inducing vanes as depicted in FIG. 4.

It should be especially appreciated that contemplated devices may be employed to mix and/or homogeneously distribute any gas, vapor, liquid, solid, or reasonable combination thereof. However, particularly preferred materials include mixtures of vapors and liquids commonly processed in refining and petrochemical plants, and especially materials that are fed into a contacting device (e.g., fixed bed catalytic reactor). Consequently, contemplated devices may advantageously be employed as inlet diffusers. In further especially preferred configurations, suitable devices are configured to be removably coupled to a vessel or inlet of a vessel.

In yet further contemplated aspects, it is generally preferred that the pressure drop over the device may be limited at least in part by the angle at which one or more of the vanes are oriented relative to the radius of the distributor. For example, where intimate mixing and substantial redistribution is less critical and a low pressure drop is highly desirable, it is contemplated that the angle of the vanes is between 1 and 25 degrees (relative to the radius). On the other hand, where proper mixing and redistribution is required at a relatively moderate pressure drop (e.g., less than 5 psi), it is contemplated that the angle of the vanes is between 26 and 60 degrees (relative to the radius). Furthermore, it should be recognized that the angle of the vanes need not be the same for all of the distributors. However, it should be recognized that the selected angle(s) for the vanes comprising each distributor will also be influenced by the fluid properties, the velocity of the fluid passing through the device, and other geometrical dimensions of the device.

Thus, specific embodiments and applications for improved mixing and distribution devices have been disclosed. It should be apparent, however, to those skilled in the art that many more modifications besides those already described are possible without departing from the inventive concepts herein. The inventive subject matter, therefore, is not to be restricted except in the spirit of this specification. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A flow distribution apparatus for distribution of a mixture of a vapor and a liquid in a vessel, comprising:

a vane distributor at least partially disposed within a cartridge, wherein the vane distributor is configured receive a vapor and a liquid and to emit an output from an inside of the vane distributor through a plurality of vanes in a first rotational motion;

a second distributing device at least partially disposed within the cartridge and configured to force the output from the vane distributor through a plurality of vanes in a second rotational motion that is opposite to the first rotational motion, wherein the output comprises a mixture of a vapor and a liquid, and wherein the flow distribution apparatus is further configured to distribute the mixture of the vapor and the liquid to the vessel.

2. The flow distribution apparatus of claim 1 wherein the vane distributor comprises a swirl-inducing vane distributor.

3. The flow distribution apparatus of claim 1 wherein the second distributing device comprises a second vane distributor.

4. The flow distribution apparatus of claim 3 wherein the vane distributor and the second vane distributor are coupled together via a perforate deck.

5. The flow distribution apparatus of claim 3 wherein the vane distributor and the second vane distributor are coupled together via an imperforate deck and the cartridge.

6. The flow distribution apparatus of claim 1 wherein the second distributing device comprises a swirl-inducing vane distributor or a chevron-type vane distributor.

7. The flow distribution apparatus of claim 6 wherein the second distributing device is disposed at least partially outside of the cartridge.

8. The flow distribution apparatus of claim 1 wherein the vane distributor has a plurality of vanes, and wherein at least one vane is positioned in an angle of less than 60 degrees relative to a radius of the cartridge.

9. The flow distribution apparatus of claim 1 wherein the vessel is a contactor.

* * * * *